(12) United States Patent
Gaessler et al.

(10) Patent No.: US 6,192,331 B1
(45) Date of Patent: Feb. 20, 2001

(54) METHOD FOR SIMULATING CONTROL FUNCTIONS OF A CONTROL DEVICE

(75) Inventors: Hermann Gaessler, Vaihingen; Karsten Mischker, Leonberg; Hendrik Koerner, Meckenheim; Rainer Mayer, Weil Der Stadt; Uwe Maienberg, Stuttgart; Arnold Winter, Filderstadt; Klaus Scherrbacher, Schwieberdingen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/123,833

(22) Filed: Jul. 28, 1998

(30) Foreign Application Priority Data

Jul. 29, 1997 (DE) .............................. 197 32 669

(51) Int. Cl.[7] .................................................. G06F 9/455
(52) U.S. Cl. ................... 703/22; 703/8; 701/35; 701/115; 700/24
(58) Field of Search ................... 703/22, 8, 13; 701/29, 31, 35, 102, 115; 700/9, 10, 23, 24; 702/116; 706/905, 920; 711/147; 717/10

(56) References Cited

U.S. PATENT DOCUMENTS

| 4,425,630 | 1/1984 | Yomogida et al. ................ 700/12 |
| 4,839,812 | 6/1989 | Nusser et al. .................... 701/35 |
| 5,083,117 | * 1/1992 | Hoigaard ........................ 340/649 |
| 5,253,158 | 10/1993 | Suzuki et al. ................... 700/23 |

FOREIGN PATENT DOCUMENTS

| 41 25 176 | 2/1993 | (DE) . |
| 195 43 826 | 5/1997 | (DE) . |
| 0 435 215 A1 | 12/1990 | (EP) . |
| 8-234826 | 9/1996 | (JP) . |

OTHER PUBLICATIONS

C.X. Chen et al., Simulation and Graphical Interface for Programming and Visualization of Sensor–Based Robot Operation, Proceedings of the 1992 IEEE Int'l Conference on Robotics and Automation, May 1992, pp. 1095–1101.*
J. R. Wagner, Failure Mode Testing Tool Set for Automotive Electronic Controllers, IEEE Transactions on Vehicular Technology, vol. 43, No. 1, Feb. 1994, pp. 156–163.*
R. Boot et al., Automated Test of ECU's in a Hardware–in––the–Loop Simulation Environment, Proceedings of the 1999 IEEE Int'l Symposium on Computer–Aided Control System Design, pp. 587–594.*

* cited by examiner

Primary Examiner—Kevin J. Teska
Assistant Examiner—Russell W. Frejd
(74) Attorney, Agent, or Firm—Kenyon & Kenyon

(57) ABSTRACT

A method for simulating control functions of a control device, in which a control program code for execution of control functions is stored in a first memory area of a memory belonging to the control device, the control program code including one or more control program code modules for the control functions, and containing at least one switching device for switching over from a control program code module SPCM to a simulation program code module. At least one simulation program code module for one or more test control functions is made available in a second memory area of the memory. The switching devices switch over from the control program code module to a pertinent simulation program code module stored in the second memory area. The control program code is then processed, the simulation program code module being executed, via the switched-over switching device, instead of the control program code module.

20 Claims, 3 Drawing Sheets

US 6,192,331 B1

METHOD FOR SIMULATING CONTROL FUNCTIONS OF A CONTROL DEVICE

FIELD OF THE INVENTION

The present invention relates to a method for simulating control functions of a control device, in particular engine control functions of a motor vehicle.

BACKGROUND INFORMATION

A control function of a control. device is stored as control program code in a memory of the control device, and is processed in order to execute the control functions. To test the functionality of the control device, it is advantageous to simulate the control program code beforehand, i.e. to represent the control functions as a model and execute a correspondingly generated simulation program code in real time. In this context, the simulation program code is generated by a simulation tool.

One or more control device functions are modeled in an "external bypass" and simulated on a processor provided in an external simulation computer. Other control functions which are not to be simulated, as well as the operating system drivers and hardware drivers, run on the internal processor provided in the control device. With the external bypass, processing of the simulation program code is accomplished in the external simulation computer, communication with the control device taking place via interfaces, for example by means of a CAN bus.

FIG. 1 shows a general configuration of an external bypass for the control program code, in which simulation of the control functions of a control device 20 to be simulated takes place in an external simulation computer 30.

Control device 20 has a plurality of control functions which are used to control an arbitrary assembly 10, for example a motor vehicle engine. For the development of new control functions or the enhancement of existing control functions of control device 20, corresponding control program code modules of the control program code stored in the control device memory are replaced by a calculation in an external processor which is located in an external simulation computer 30. The simulation program code generated by the simulation tool is processed in the external processor of simulation computer 30. While assembly 10 is operating, for example while the engine is operating, the simulation program code receives the corresponding input variables or input data, via interfaces, from the control program code of control device 20; it then executes or processes them, and writes the output data or result variables back into control device 20. It is thereby possible during operation to modify, for example, the engine control functions of a vehicle, and observe the results directly on the vehicle. The control functions of control device 20 to be tested are modeled by an input device 40, and entered into the external simulation computer.

The input data for the control functions displaced into the external simulation computer 30 are made available by control device 20, and the output data of the control functions displaced into the external simulation computer 30 are delivered back to control device 20.

The external bypass, described above, of portions of the control program code stored in control device 20 has several disadvantages. An external simulation computer is necessary for simulating the control device functions. In addition, the interfaces must be so fast that the input variables arriving from the external assembly are available quickly enough to the simulation computer, and the calculated data are available in timely fashion to control device 20 for further processing in the control device program.

This means an additional hardware outlay for the additional interfaces and the external simulation computer itself. Data are continually being exchanged via the interfaces between control device 20 and the external simulation computer 30, additional time being required for the data transmission. This time loss can considerably impair a simulation of the control device functions that must occur in real time. The simulation computer 30 to be provided in the case of the external bypass is, moreover, not designed for certain environmental conditions, as control device 20 is. It is thus not possible to take into account appropriately the influence of environmental conditions on the simulation.

SUMMARY OF THE INVENTION

The method according to the present invention for simulating control functions of a control device is advantageous in that data exchange between the control program code and the simulation program code is considerably simplified.

It is also advantageous, according to the present invention, that both the control program code and the simulation program code are located in the control device itself, i.e. that the control program code and the simulation program code are exposed to the same environmental conditions.

It is further advantageous to perform the simulation directly in the control device itself, without displacing that simulation into an external simulation computer. This greatly reduces the equipment outlay.

According to another embodiment of the present invention, the simulation program code module that is made available is generated from a test control function, the test control function being input into the control device via an input device.

This is advantageous in that only specific control functions to be tested, and not the totality of all control functions stored in the control device, are simulated.

According to another embodiment of the present invention, the switching device is switched over to a branch address of a simulation program code module stored in the second memory area.

According to another embodiment of the present invention, the branch address for a simulation program code module stored in the second memory area is defined in each case upon generation of the control program code.

According to another embodiment of the present invention, a common branch address is made available for all the simulation program code modules stored in the second memory area, activation of the simulation program code modules belonging to the control functions to be simulated being performed by means of flags or markers.

According to another embodiment of the present invention, each control program code module is independently simulated by a pertinent simulation program code module.

According to another embodiment of the present invention, the control function to be simulated is selected as a test control function via the input device.

According to another embodiment of the present invention, the control functions of the control device to be simulated are simulated in real time.

According to another embodiment of the present invention, the simulation of the control functions to be simulated occurs internally on a processor provided in the control device.

According to another embodiment of the present invention, a predetermined data exchange method is provided, by means of which input data are conveyed to the simulation program code modules and by means of which the simulation program code modules deliver output data.

According to another embodiment of the present invention, the data exchange method delivers information to the simulation program code modules about memory addresses for reading out input data and writing in output data.

According to another embodiment of the present invention, the switching device has at least two switchable states for switching from a control program code module to a simulation program code module, the pertinent control program code module being executed in a first switchable state, and the pertinent simulation program code module being executed in a second switchable state.

According to another embodiment of the present invention, one or more test control functions are input for each control function to be simulated.

This is advantageous in that several different test control functions, representing different models, can be entered for a control function to be simulated, and can be alternatively tested by switching over the switching device.

According to another embodiment of the present invention, the test control functions are entered textually or graphically via the input device.

This is advantageous in that the operator can enter the test control functions in intuitive and simple fashion.

According to another embodiment of the present invention, a pertinent control program code module is associated with the first switchable state, and a respective pertinent simulation program code module is associated with each further switchable state of the switching device.

According to another embodiment of the present invention, the switching device is stored as program code in the first memory area of the memory.

DETAILED DESCRIPTION

Figure 1:
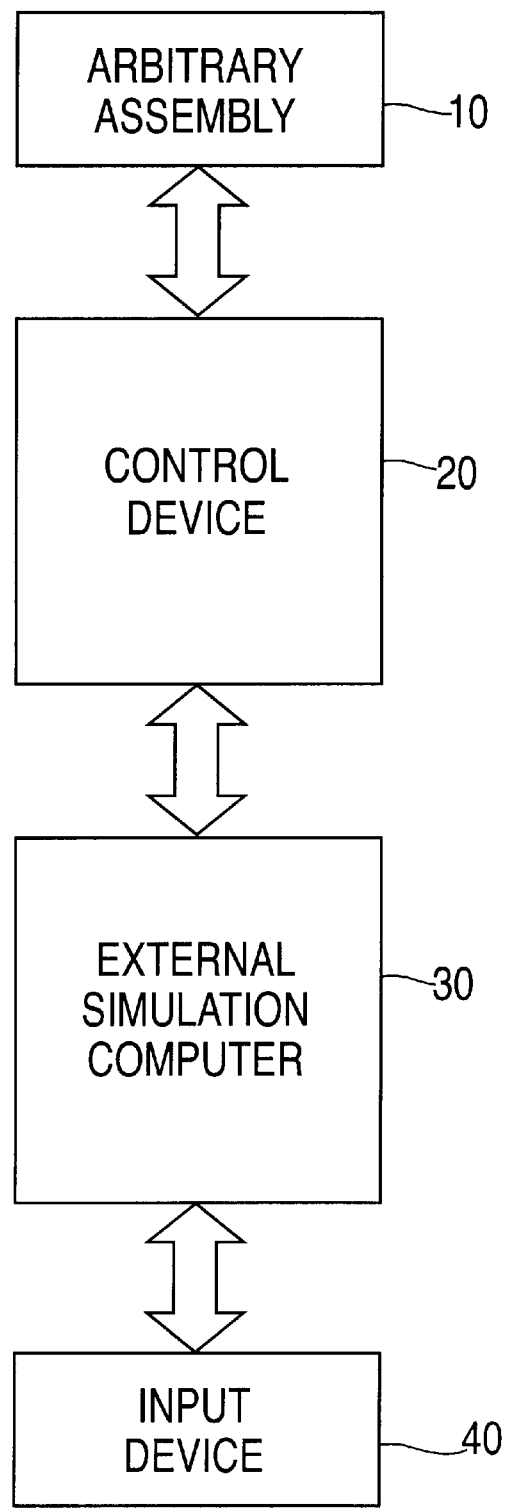
FIG. 1 shows a block diagram of an external bypass with an external simulation computer for performing a simulation of control functions of a control device.
Figure 2:
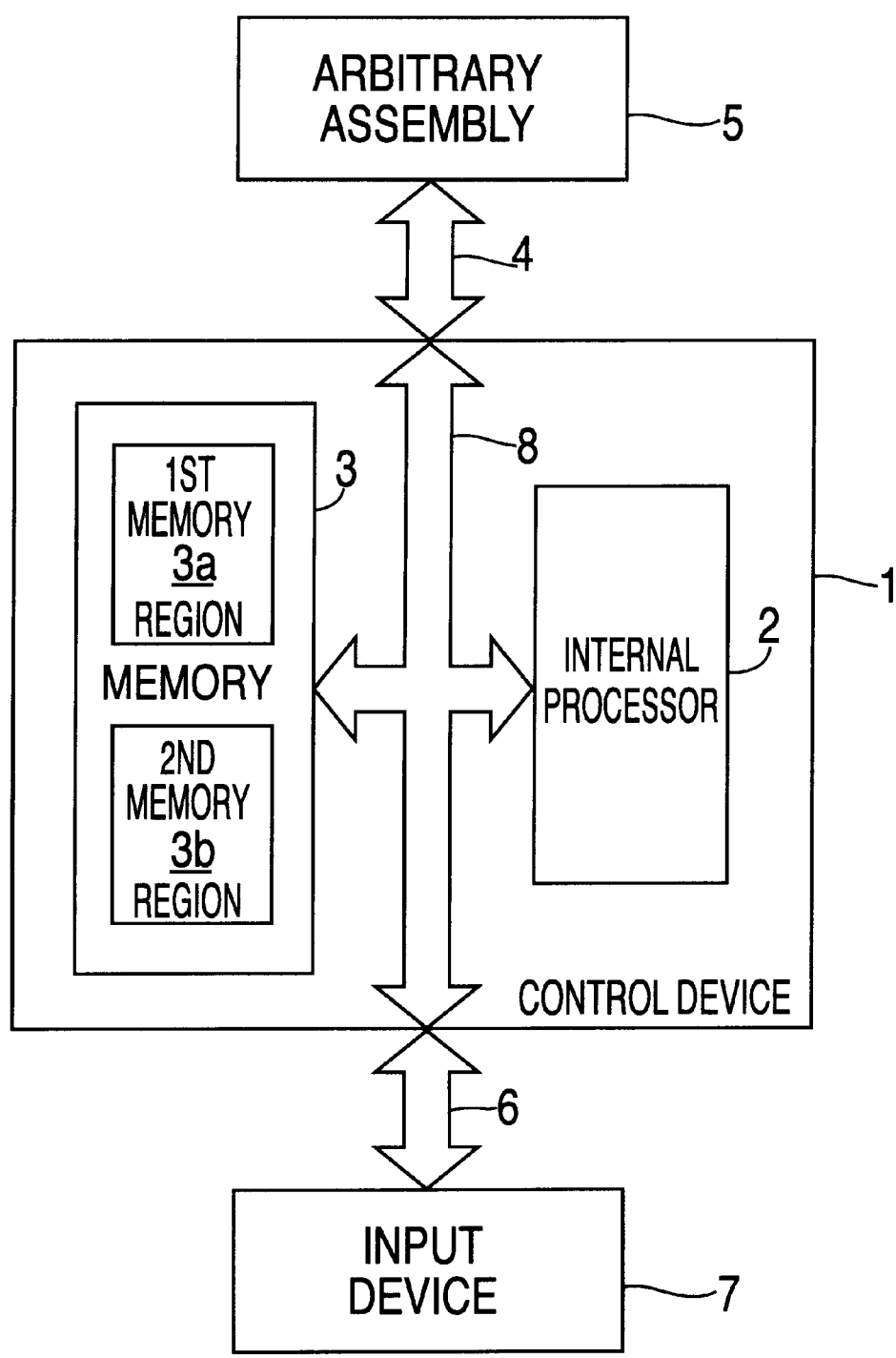
FIG. 2 shows a block diagram of a control device for performing the method according to the present invention for simulating control functions of the control device.

FIG. 2 shows a control device 1 for performing the method according to the present invention.

Control device 1 has a separate internal processor 2 and a memory 3. Memory 3 possesses a first memory region 3a to store a control program code SPC, and a second memory area 3b to store a simulation program code SIMPCM. Control device 1 is connected via control and sensor lines 4 to an arbitrary assembly 5, for example a motor vehicle engine. Control device 1 is further connected via input lines 6 to an input device 7 for inputting test control functions. Processor 2 and internal memory 3 of control device 1 are interconnected via an internal bus 8. Internal bus 8 is connected via interfaces (not depicted in FIG. 2) to input lines 6 and to control and sensor lines 4.

Control device 1 controls assembly 5 by means of control functions which are stored as control program code SPC in first memory area 3a of memory 3. The control program code stored in first memory area 3a consists of one or more control program code modules and at least one switching device (e.g., an engine) S for switching over from a control program code module SPCM to a simulation program code module SIMPCM stored in second memory area 3b.

To simulate specific control functions of control device 1 which are used to control assembly 5, test control functions are input into control device 1 via input device 7, input lines 6, an input interface, and bus 8, and converted by processor 2 into a simulation program code which is stored as one or more simulation program code modules in second memory area 3b of memory 3. For each control function of control device 1 that is to be simulated and is stored as control program code in first memory area 3a of the memory, one or more test control functions are input and are stored as simulation program code in second memory area 3b. The test control functions are input in graphical or textual form into the input device, and the corresponding machine code (which is generated by means of a compiler running on the input device) is processed in processor 2.

Figure 3:
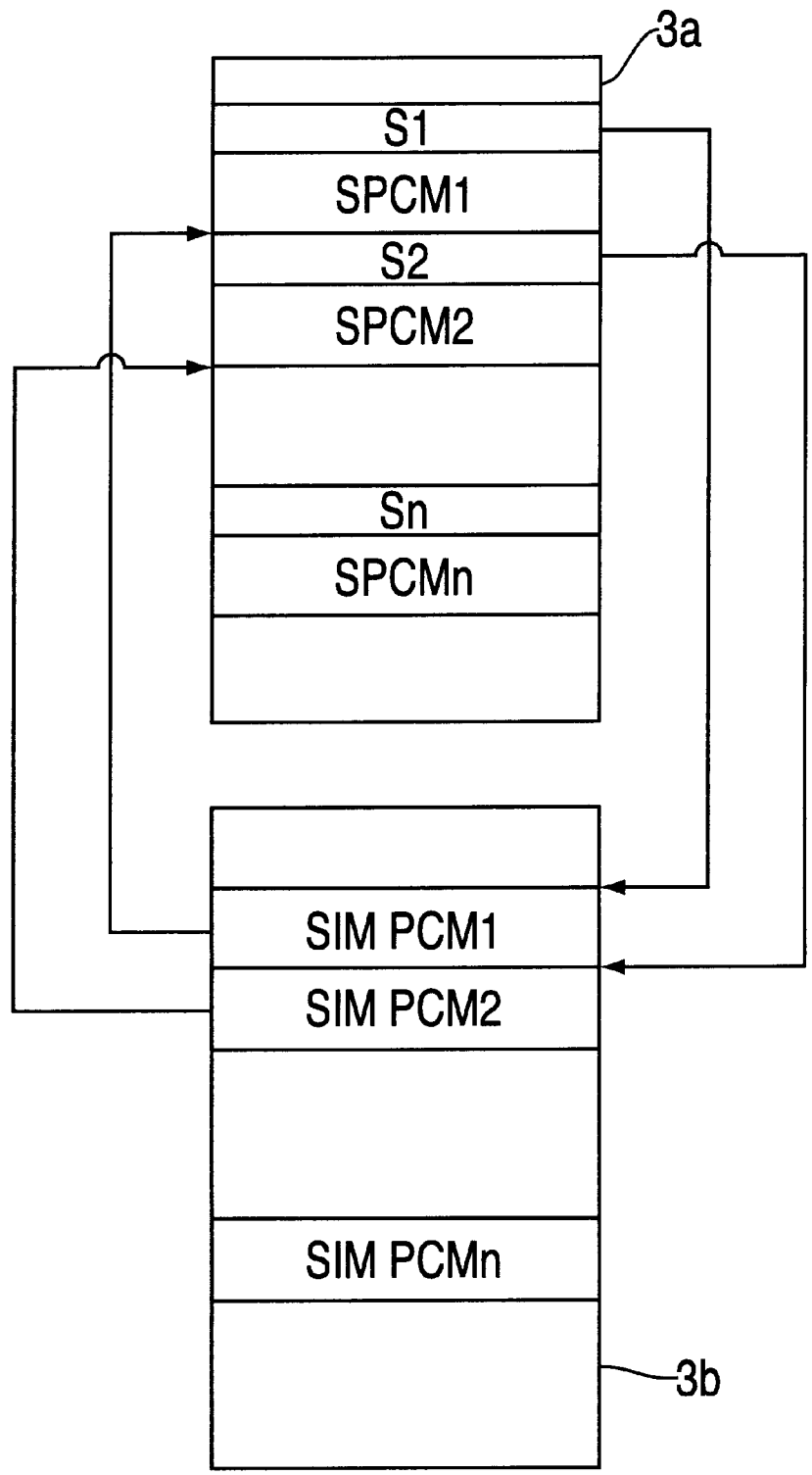
FIG. 3 shows a diagram of memory contents inside first and second memory areas of the control device illustrated in FIG. 2.

FIG. 3 schematically shows the occupancy of first memory area 3a and second memory area 3b of memory 3 of control device 1 illustrated in FIG. 2.

Control program code SPC for performing the control device functions is located, organized in modular fashion, in first memory area 3a. Control program code SPC is subdivided into multiple control program code modules SPCM that can be independently simulated. Each control program code module SPCM executes one or more control functions of control device 1.

Also provided in first memory area 3a are switching devices S for switching over from a control program code module SPCM to a simulation program code module SIMPCM.

These switching devices S stored in first memory area 3a have at least two switchable states, a pertinent control program code module SPCM being executed in a first switchable state, and a pertinent simulation program code module SIMPCM being executed in a second switchable state.

Switching device S can also have more than two switchable states, the pertinent control program code module being executed in the first switchable state, and a pertinent simulation program code module SIMPCM that is stored in second memory region 3b being executed in each further switchable state.

A control program code SPCM stored in first memory area 3a corresponds to one or more original control functions of control device 1, and simulation program code modules SIMPCM stored in second memory area 3b correspond to one or more test control functions entered via input device 7.

Individual control program code modules SPCM can be independently simulated by means of at least one pertinent simulation program code module SIMPCM. A simulation program module can, however, also represent a completely new function that has no counterpart in the control program code.

The control functions of control device 1 to be simulated can be selected by means of input device 7. This takes place by means of switching device S stored in first memory area 3a, so that an operator can arbitrarily control the program flow externally.

The switching devices, which have at least two switchable states, are switched by corresponding inputs in such a way that either a control program code module SPCM pertinent to switching device S, or a pertinent simulation program code module SIMPCM, is executed. Switching devices S are also stored, as program code, in first memory area 3a of memory 3. A switching device S is arrived at during the processing of control program code SPC, whereupon, in accordance with the switching state of switching device S, either a subsequent control program code module SPCM or a simulation program code module SIMPCM is executed.

Switching device S points to a branch address of a simulation program code module SIMPCM stored in second memory area 3b. If switching device S is in the second switchable state, the program branches to the associated simulation program code module SIMPCM and executes it.

As shown in FIG. 3, a switching device (e.g., an engine) S1 is reached first during the processing of control program code SPC, whereupon either control program code module SPC1 or the corresponding, or a new, simulation program code module SIMPCM1 is executed as a function of its switching state. If switching device S1 is in the second switchable state, i.e., if the control functions stored in control program code module SPCM are to be simulated, the program branches to the branch address located at the beginning of simulation program code module SIMPCM1.

Simulation program code module SIMPCM1 is then run on processor 2, the test control functions acting correspondingly on assembly 5 while it is operating.

When simulation program code module SIMPCM1 has been executed, program execution returns to a switching device (e.g., an engine) S2 in first memory area 3a. If switch S2 is also in the second switchable state, program execution branches to a second simulation program code module SIMPCM2 which performs test control functions that correspond to the control functions stored in second control program code module SPM2.

By switching the switching device S1, S2, . . . Sn, the operator can select whether the original control program code SPC or a simulation program code SIMPCM is executed.

The branch addresses to simulation program code modules SIMPCM stored in second memory area 3b are either defined when control program code SPC is generated, or a common branch address is made available for all the simulation program code modules SIMPCM stored in second memory area 3b, and activation of the simulation program code modules SIMPCM belonging to the control functions to be simulated is accomplished via flags or markers. These flags are universally usable control bits, and indicate the existence of a specific state.

A specific data exchange method is provided by means of which input data are conveyed to the simulation program code modules SIMPCM, and by means of which the simulation program code modules SIMPCM deliver output data. With this data exchange method, the simulation program code that is generated can be instrumentalized, (e.g., can be stimulated) by input data and can access data of the control device software. By means of the data exchange format, information about memory addresses for reading out input data and for writing in output data are conveyed to simulation program code modules SIMPCM.

Switching devices S stored in first memory area 3a are stored, for example, as program code in the form of IF-THEN-ELSE program branch instructions. Alternatively, programming as a GOTO branch instruction is also possible.

In the case of the internal bypass described above in conjunction with FIG. 3, simulation of the control functions to be simulated, which are stored as control program code modules SPCM in first memory area 3a, takes place internally on processor 2 provided in control device 1. The control functions to be simulated are simulated in real time.

Since no data exchange needs to occur with an external simulation computer, considerable time required to transmit data to the simulation computer, and to transmit the calculated data from the simulation computer to the processor in control device 20, is reduced or eliminated.

Simulation program code modules SIMPCM can directly access the input and output data of the control program that are located in memory 3. This also speeds up the simulation and reduces the simulation time.

Switching devices S make it possible for an operator to control the program flow in an easy and convenient manner. The control program that is processed consists on the one hand of original control program sections in the form of control program code modules SPCM, and on the other hand of simulation program sections in the form of simulation program code modules SIMPCM. The simulation is thus very flexible.

Since simulation program code modules SIMPCM are located in the same memory as control program code modules SPCM, and execute on the same processor, they are exposed to the same degree to environmental conditions which act on control device 1. The simulation is thus performed under realistic conditions, and its predictive value increases.

The present invention is not limited to the embodiments described herein, and can be modified in many ways.

For example, the first and second memory areas can be configured as independent memories.

It is also possible for multiple assemblies to be controlled simultaneously by control device 1, and for a simulation to be performed simultaneously for multiple assemblies.

It is furthermore possible for the simulation program code not to be input via input device 7 as a test function, but to be connected directly in a memory that can be attached to control device 1.

It is moreover possible for the method according to the present invention, with its internal bypass of control program code modules, to be used in combination with an external bypass.

What is claimed is:

1. A method for simulating at least one control function of a control device, comprising the steps of:

storing a control program code for executing the at least one control function in a first memory area of a memory device, the control device including the memory device, the control program code including at least one control program code module which controls the at least one control function;

providing at least one simulation program code module for controlling at least one test function in a second memory area of the memory device;

switching at least one switching element from the at least one control program code module to the at least one simulation program code module; and processing the control program code, the at least one simulation program code module being executed, via the switched at least one switching element, instead of the at least one control program code module, wherein the control program code and the at least one simulation program code module are performed by an internal processor of the control device.

2. The method according to claim 1, further comprising the step of:
providing the at least one test function via an input device; and
generating the at least one simulation program code module from the provided at least one test function.

3. The method according to claim 1, wherein the at least one switching element is switched to a branch address of the at least one simulation program code module.

4. The method according to claim 3, wherein the branch address is determined when the control program code is generated.

5. The method according to claim 3, further comprising the step of:
providing a common branch address for each of the at least one simulation program code module, wherein the at least one simulation program code module which corresponds to the at least one control function to be simulated is executed using flags.

6. The method according to claim 1, wherein each of the at least one control program code module is independently simulated by a corresponding one of the at least one simulation program code module.

7. The method according to claim 1, further comprising the step of:
selecting the at least one control function to be simulated via an input device.

8. The method according to claim 1, wherein the at least one control function to be simulated is simulated in real time.

9. The method according to claim 1, wherein the at least one control function is simulated internally on a processor of the control device.

10. The method according to claim 1, further comprising the step of:
using a predetermined data exchange technique, providing input and output data to the at least one simulation program code module.

11. The method according to claim 10, further comprising the step of:
using the data exchange technique, providing information corresponding to memory addresses to the at least one simulation program code module, the information being provided for receiving the input data and for generating the output data.

12. The method according to claim 1, wherein the at least one switching element has at least two switchable states for switching from a first of the at least one control program code module to a corresponding first of the at least one simulation program code module, the first module being executed in a first state of the at least two switchable states, the corresponding first module being executed in a second state of the at least two switchable states.

13. The method according to claim 1, wherein the at least one test function is received for each of the at least one control function to be simulated.

14. The method according to claim 1, wherein the at least one test function is provided using one of a graphical textual description and a textual description.

15. The method according to claim 1,
wherein the at least one switching element has a first switchable state and at least one second switchable state,
wherein the at least one control program code module is associated with the first state, and
wherein the at least one simulation program code module is associated with the at least one second state.

16. The method according to claim 1, wherein the at least one switching element is stored as a program code in the first memory area of the memory device.

17. A control system for simulating at least one control function, the system comprising:
an internal processor;
an arrangement for storing a control program code for executing the at least one control function in a first memory area, the control program code including at least one control program code module for controlling the at least one control function, the arrangement for storing having a second memory area and being associated with the internal processor;
an arrangement for providing at least one simulation program code module for controlling at least one test function in the second memory area;
an arrangement for switching at least one switching element from the at least one control program code module to the at least one simulation program code module; and
an arrangement for processing the control program code, the at least one simulation program code module being executed, via the switched at least one switching element, instead of the at least one control program code module, wherein the control program code and the at least one simulation program code module are performed by the internal processor.

18. The system according to claim 17, further comprising:
an arrangement for providing input data and output data to the at least one simulation program code module.

19. The system according to claim 18, further comprising:
an arrangement for providing information corresponding to memory addresses to the at least one simulation program code module, the information being provided for receiving the input data and for generating the output data.

20. A control system for simulating at least one control function, the system comprising:
means for processing;
means for storing a control program code for executing the at least one control function in a first memory area, the control program code including at least one control program code module for controlling the at least one control function, the arrangement for storing having a second memory area and being associated with the internal processor;
means for providing at least one simulation program code module for controlling at least one test function in the second memory area;
means for switching at least one switching element from the at least one control program code module to the at least one simulation program code module; and
means for processing the control program code, the at least one simulation program code module being executed, via the switched at least one switching element, instead of the at least one control program code module, wherein the control program code and the at least one simulation program code module are performed by the means for processing.

* * * * *